May 16, 1950 W. C. POETSCH 2,508,290
ELECTRIC LIQUID LEVEL GAUGE
Filed March 8, 1946 2 Sheets-Sheet 1
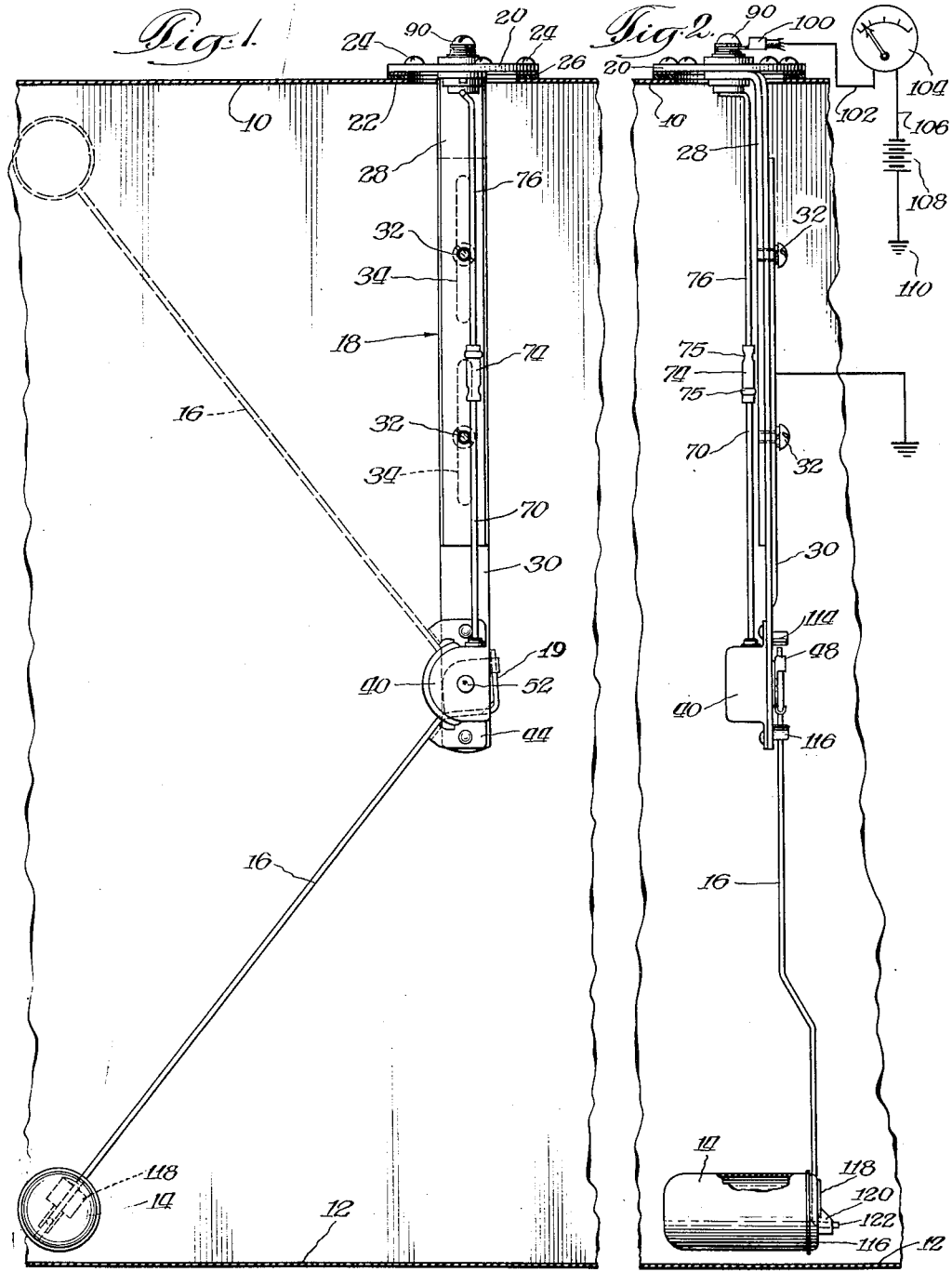
Inventor
William C. Poetsch
By Williams, Bradbury & Hinkle
Attorneys May 16, 1950 W. C. POETSCH 2,508,290
ELECTRIC LIQUID LEVEL GAUGE
Filed March 8, 1946 2 Sheets-Sheet 2

Inventor:
William C. Poetsch
By Williams, Bradbury & Hinkle
Attorneys.

Patented May 16, 1950

2,508,290

UNITED STATES PATENT OFFICE 2,508,290

ELECTRIC LIQUID LEVEL GAUGE

William C. Poetsch, Chicago, Ill., assignor to Stewart-Warner Corporation, Chicago, Ill., a corporation of Virginia Application March 8, 1946, Serial No. 652,948

8 Claims. (Cl. 201—48)

1

This invention relates to a gauge unit to be mounted in a tank or reservoir containing liquid, said unit being adapted to actuate an instrument at a distance from the tank for indicating the level or quantity of liquid therein. An example of such use is in the fuel tank of an automobile or an airplane.

One object of the invention is to provide a gauge unit adapted to be mounted entirely within the tank with an electrical conductor extending therefrom to the indicating device, thus permitting the tank to be sealed, if desired.

Another object of the invention is to provide a gauge unit and means for mounting the same in a tank, said means being adjustable for adapting it to tanks of different sizes and shapes.

A further object of the invention is to provide a new and improved gauge unit adapted to be completely assembled and tested before installation in a tank and dimensioned for insertion therein through a relatively small opening in the tank wall.

Other objects and advantages will appear from the following description taken in connection with the drawings in which:

Fig. 1 is a front elevation of a gauge unit embodying this invention showing it as mounted in a tank, a fragment of the tank being shown in section;

Fig. 2 is a side elevation of the gauge unit together with a wiring diagram showing an indicating device associated therewith;

The gauge unit embodying this invention comprises a movable float responsive to changes in the level of the liquid in a tank or reservoir together with an electrical resistance element and a movable contactor therefor actuated by the float so as to change the effective resistance of the element in a circuit which includes an indicating device outside the tank. Heretofore, the resistance element and its circuit connections have been arranged entirely outside the tank, but this required an operative mechanical connection extending through a wall of the tank to the float therein and thus required an opening or at least a bearing in the wall of the tank which was

2 difficult to seal. In the present construction, the resistance element is disposed inside the tank so that only an electrical conductor is required to extend through the wall and this can be effectively sealed, if desired.

Figure 3:
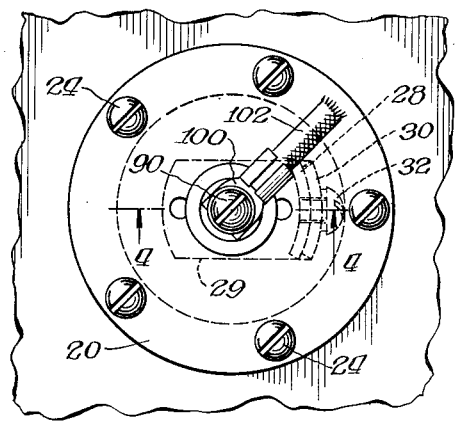
Fig. 3 is a top plan view of the mounting plate by which the unit is supported in the tank.
Figure 4:
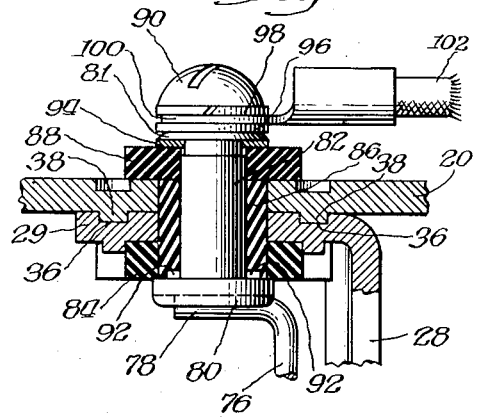
Fig. 4 is a detailed sectional view as indicated at line 4—4 on Fig. 3.

Fig. 1 shows a fragment of the top wall 10 of a tank and a fragment of the bottom wall 12 between which walls the float 14 has a range of movement indicated by the full line and dotted line positions in which it is shown in the view. The float is carried by a float arm 16 which is pivotally connected to a support 18 extending downwardly into the tank from a mounting plate or flange 20 attached externally to the top wall 10. Said top wall may include a reinforcing ring 22 brazed or welded thereto, so that the flange 20 may be secured to the ring 22 by screws 24 with a sealing gasket 26 interposed. The support 18 is composed of an upper arm or member 28 and a lower arm or member 30 longitudinally lapping the arm 28. The upper arm 28 is tapped to receive clamping screws 32, 32 and these screws extend through vertically elongated slots 34, 34 in the lower arm 30 to provide the desired range of vertical adjustment which adapts the device to be installed in tanks of different depths. Preferably, the overlapping portions of the members 28 and 30 are of curved cross section, as indicated in Fig. 3, so that they are nested together and are held in vertical alignment by this interfitting relation during assembly and while the screws 32 are being inserted. At the upper end, the member 28 has a terminal portion 29 bent at right angles and extending horizontally for securement to the underside of the mounting plate or flange 20; to insure proper positioning of the unit within the tank and to maintain it in such position, the part 29 is formed with a pair of depressions or recesses 36 and the under side of the plate 20 is formed with projections 38 which engage the recesses 36, as seen in Fig. 4.

At the lower end of the supporting member 30 a housing 40 is attached thereto by rivets 42, 42 which extend through wings or flanges 44, 44 of the housing. The float arm 16 has a short portion 17 bent at an obtuse angle to the main portion of the arm and a terminal portion 19 bent at right angles to the part 17. The parts 17 and 19 are engaged by clips 46 and 48 of a supporting flange 50 which is secured to a shaft 52 journaled in the lower end portion of the support member 30 and also steadied in a bearing 53 formed in the vertical wall of the housing 40 which is disposed opposite the lower end of the part 30 and in spaced relation thereto. A hub 54 is secured to the shaft 52 on the side of the part 30 opposite that at which the flange 50 is disposed and the said hub is formed with a flange 56 which bears against the part 30 and definitely positions the shaft 52 with relation thereto.

Figure 5:
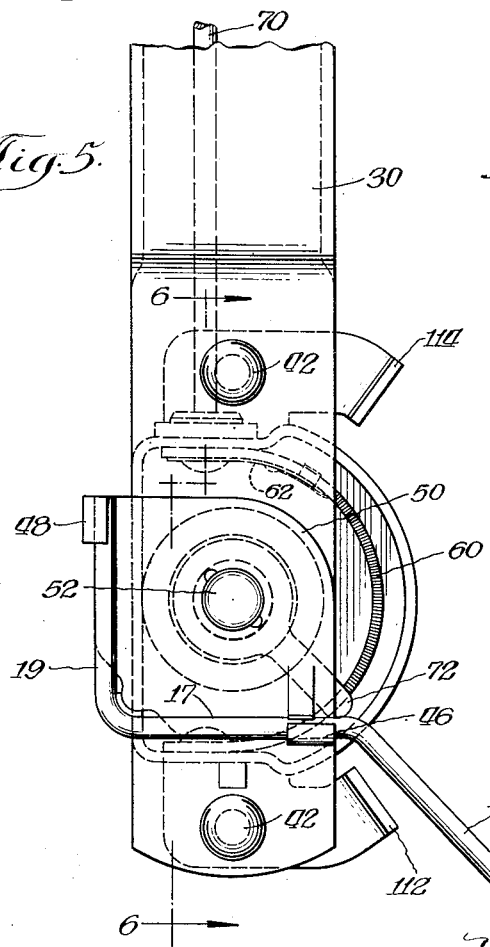
Fig. 5 is an enlarged rear elevation of the resistance element and associated parts of the sending device embodied in the gauge unit.

Within the housing 40, there is mounted an electrical resistance unit comprising a coil 60 of resistance wire wound upon a core 62 of insulating material which, as shown in Fig. 5, is bent in arcuate form with the lower end secured to the wall of the housing 40 by a rivet 64 and with its upper end similarly secured by a long rivet 66 which is insulated from the housing 64 by means of insulating washers 67 and 68. The body of the rivet 66 is hollow and a conductor 70 is inserted and secured therein in good electrical connection with the rivet 66. One end of the coil 60 is grounded by securement of the terminal portion 61 of the wire under the head of the rivet 64. The other end 63 of the wire 60 is connected to a metallic clip 65 which is clamped under the head of the rivet 66 and thus connects the coil 60 with the conductor 70. A movable ground connection for the coil 60 is provided in the form of a resilient contact arm 72 carried by the hub 54 on the shaft 52 so as to be swung in an arc by movement of the float 14 which swings its float arm 16 about the axis of the shaft 52. The contact arm 72 is thus caused to traverse the arcuate edge of the coil 60 and to vary the effective resistance of the coil 60 in the circuit in which it is connected by grounding it at points more or less remote from the end of the coil which is connected to the conductor 70.

The conductor 70 is conected by a coupling sleeve 74 with a second conductor 76 in alignment with it, and the upper end of the conductor 76 has a terminal portion 78 which is brazed or soldered into a groove in the downwardly exposed head 80 of a stud 82 fixed in the plate or flange 20. The stud 82, by which the terminal 29 of the arm 28 is secured to the flange 20, is insulated from the flange 20 and from the terminal 29 by means of a washer 84, a sleeve 86 and a washer 88, all of insulating material. Said stud 82 is internally threaded to receive a binding screw 90 exposed at the upper end of the stud and outside the flange 20. Preferably, the insulating sleeve 86 is fitted tightly in the central opening in the flange 20 and the stud 82 is interlocked with it by a pair of lugs 92 formed under its head and engaging suitable recesses in the end of the sleeve 86. The stud 82 with its insulating sleeve and washers is secured firmly in the plate 20 by rolling over and clinching its terminal portion 81 against a washer 94. A washer 96 and a lock washer 98 under the head of the screw 90 serve to grip the terminal clip 100 of a conductor wire 102 which leads to the indicating instrument 104, as shown diagrammatically in Fig. 2. Said instrument may be connected by conductor 106 to a battery 108 or other source of electrical energy and the other side of the battery may be grounded, as indicated at 110. Since the coil 60 is grounded through the contact arm 72 and the metallic parts by which said arm is supported in the tank, a circuit is thus completed which includes the portion of the resistance coil 60 between the arm 72 and the rivet 66. Then, as the float 14 and its arm 16 rise and fall in the tank, the effective resistance of the coil 60 is varied and the indication of the instrument 104 is altered to correspond with the position of the float and the level of liquid which determines that position in the tank.

As already noted, the slidable adjustment of the supporting member 30 on the member 28 permits adapting the apparatus to tanks of different depths; in view of this adjustability, the conductor leading from the resistance coil 60 consists of the two parts 70 and 76, one of which will be made with some extra length so that it can be cut to fit any particular installation and then coupled to the other conductor section by means of the sleeve 74 which is compressed at 75, 75 into good electrical contact with the conductor sections 70 and 76. Preferably, the unit will be installed in a tank so that the float arm 16 will swing in a vertical plane about midway between the forward and rear faces of the tank with the float 14 disposed approximately at the middle of the width of the tank, thus minimizing the changes in level of the float which will be caused by tilting of the vehicle laterally or longitudinally.

Figure 6:
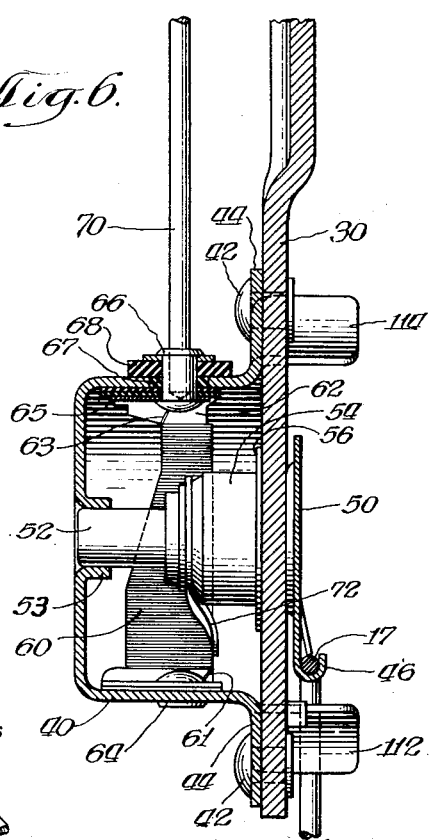
Fig. 6 is a vertical sectional view as indicated by the line 6—6 in Fig. 5.

To avoid injury to the contact arm 72, the range of movement of the float arm 16 is positively limited by stop plugs 112 and 114 which are made integrally with the mounting flanges 44, 44 of the housing 40 and are bent at right angles to the plane of said flanges, as seen in Figs. 5 and 6. The float itself includes a cover or end wall 116 to which there is soldered or welded a clip 118 having a pair of spaced wings 120 upstanding from the face of the wall 116. Said wall is formed with a diametral groove which is overlapped by the flat portion of the clip 118 and provides a channel through which the round rod serving as the float arm 16 is inserted after which the end portion of the rod is bent at right angles to form a terminal 122 around which the wings 120 are crimped. This permits the rod 16 to be initially made of a maximum length suitable for the largest tank to which the device is adapted so that the rod 16 may then be cut to a suitable length for the particular tank in which the gauge unit is to be installed and then bent at 122 when the float is attached to it. The unit as manufactured is thus adapted to be installed in tanks of different depths with the assurance that the float itself can be made to swing through substantially the full depth of any such tanks.

As will be clear from Figs. 1 and 2, the complete unit, including the mounting plate 20, supporting members 28 and 30, resistance element 60 and float 14 on its arm 16, can be assembled outside the tank and tested before installation; then it can be introduced through the opening defined by the reinforcing ring 22, and will be definitely located and firmly secured in operative position by the screws 32. The resistance element 60 and its contactor 72, constituting the so-called "sending unit" of the indicating system may then be wired to the indicating instrument at any convenient point in the assembly process.

While there is shown and described herein certain structure embodying the invention and illustrative thereof, it is to be understood that the invention is not limited thereto or thereby but embraces all changes and modifications in its various features which may come within the scope of the appended claims.

I claim:

1. In a gauge unit, a mounting plate adapted to be secured over an opening in the wall of a tank, a supporting arm depending rigidly from the said plate, a second arm longitudinally lapped upon the first arm, releasable clamping means securing said arms together to adapt the same for longitudinal adjustment, a float with a float arm attached thereto, a pivotal mounting for said float arm carried by said second arm, an electrical resistance element mounted on said second arm to be supported within a tank adjacent said pivotal mounting, a contactor movable relative to the resistance element in response to movement of the float arm about its pivotal mounting to vary the effective resistance of said element, and conductor means to connect said resistance element in an indicator circuit, said conductor means extending from said resistance element through the mounting plate and insulated therefrom including two parts adapted to be adjusted as to length in accordance with the adjustment of the supporting arms, and means for coupling the two parts together after the length thereof has been determined.

2. In a gauge unit, a mounting plate adapted to be secured over an opening in the wall of a tank, a supporting arm independent of said tank structure depending from said plate to a point in the central region of said tank, said arm having a termnial portion at its upper end bent to engage the under side of said plate, a hollow stud extending through said plate and said terminal and securing them rigidly together, a float with a float arm attached thereto, a pivotal mounting for said float arm carried by said supporting arm, an electrical resistance element mounted on said supporting arm within the tank adjacent said pivotal mounting, a contactor movable relative to the resistance element in response to movement of the float arm about its pivotal mounting to vary the effective resistance of said element, conductor means independent of said support to connect said resistance element in an indicator circuit, said conductor means extending from said element to said stud, means insulating the stud from the mounting plate and from said terminal of the supporting arm, and means for connecting a conductor to the portion of the stud which extends outside the tank including a screw threaded into the hollow stud for securing the terminal of the conductor to the outer end of the stud.

3. In the combination defined in claim 2, said mounting plate and said terminal portion of the supporting arm having interengaging lugs and recesses which prevents rotation of said terminal about the axis of said stud and relative to the mounting plate.

4. A device of the class described adapted to be installed in a tank or other liquid reservoir comprising a resistance element, a float movably mounted to respond to changes in the level of the liquid in said tank, a contact moved over said resistance element in response to movement of said float to vary the effective resistance thereof in response to changes in the level of the liquid in said tank, a support adapted to be rigidly secured at one end with respect to said tank and carrying said resistance element, contact and float adjacent its opposite end, said support being longitudinally extensible to position the elements supported thereby in the central region of said tank, and a longitudinally extensible conductor extending from said resistance element.

5. A device of the class described adapted to be installed in a tank or other liquid reservoir comprising a longitudinally extensible support rigidly secured at one end with respect to said liquid reservoir, a generally cup-shaped stamped sheet metal housing having radially extending wings on opposite sides thereof adapted to be secured to the lower end of said support to secure the housing thereto and transverse extensions on said wings having laterally bent tips forming spaced upper and lower stops, a resistance element secured in said housing, a float arm and float, a pivotally movable support for said float extending into said housing, said stops defining the extreme limits of pivotal movement of said float arm, and a contact moved over said resistance element in response to movement of said float to vary the effective resistance thereof in response to changes in the level of the liquid in said tank.

6. In a device of the class described, a mounting plate adapted to be secured over an opening in the wall of a tank, a first elongated supporting member depending rigidly from said plate, a second elongated supporting member adjustably longitudinally relative to the first supporting member, said supporting members being complementarily curved in cross-section to rigidify the support, means for securing said members at a position of adjustment including longitudinally aligned slots in one member and locking screws in the other extending through said slots and adapted to be tightened to lock said members against relative movement, a float with a float arm attached thereto, a pivotal mounting for said float arm carried by said second supporting member, an electrical resistance element mounted on said second supporting member to be supported within a tank adjacent said pivotal mounting, a contactor movable relative to the resistance element in response to movement of the float arm upon its pivotal mounting to vary the effective resistance of said element, and longitudinally extensible conductor means extending from said resistance element through the mounting plate and insulated therefrom.

7. A device of the class described adapted to be installed in a tank or other liquid reservoir, comprising a support rigidly secured at one end with respect to said reservoir, a generally cup-shaped housing having radially extending wings on opposite sides of the open end thereof adapted to be secured to the lower end of said support to secure said housing thereto, a resistance element secured in said housing, a float arm and float, a shaft for said float arm journaled at opposite ends in the end of said cup and the lower end of said support and having an end projecting from the latter, means for fixedly securing said float arm to the end of said shaft projecting from said support, a hub fixed to the portion of said shaft in said housing and engaging the inner side of said support to cooperate with the means for securing the float arm to said shaft to limit endwise movement of the shaft, and a contact carried by said hub and moved over said resistance element upon pivotal movement of said shaft imparted thereto by said float arm and float to vary the effective resistance of the resistance element in response to changes in the level of the liquid in said reservoir.

8. In a gauge unit, a mounting plate adapted to be secured over an opening in the wall of a tank, a support depending rigidly from said plate, a float with a float arm attached thereto, a pivotal mounting for said float arm carried by said support, an electrical resistance element mounted on said support within the tank adjacent said pivotal mounting, a contactor movable relative to the resistance element in response to movement of the float arm about its pivotal mounting and operative to vary the effective resistance of said element, and conductor means extending from said resistance element through the mounting plate, said pivotal mounting for the float arm being vertically adjustable to accommodate the unit to tanks of different depths, and the float having a clip secured to one end wall and shaped to provide a channel across said end wall, through which channel the end portion of the float arm may be slidably inserted to position the float correctly for the tank in which it is to be installed, said clip including a pair of spaced wings between which the terminal portion of said float arm may be bent to extend and which may be deformed around said terminal to retain the float on the arm and prevent turning of the float around the float arm.

WILLIAM C. POETSCH.

REFERENCES CITED

The following references are of record in the file of this patent:

UNITED STATES PATENTS

| Number | Name | Date |
|---|---|---|
| 1,607,512 | Churcher et al. | Nov. 16, 1926 |
| 1,616,529 | Dittlinger et al. | Feb. 8, 1927 |
| 1,634,165 | Williams | June 28, 1927 |
| 1,678,115 | Hanon | July 24, 1928 |
| 1,810,818 | Cheney | June 16, 1931 |
| 1,820,369 | Zeibig | Aug. 25, 1931 |
| 1,902,933 | Zubaty | Mar. 28, 1933 |
| 2,266,298 | Bacon | Dec. 16, 1941 |